United States Patent
Inomata et al.

(10) Patent No.: US 10,903,012 B2
(45) Date of Patent: Jan. 26, 2021

(54) CERAMIC CAPACITOR, CIRCUIT SUBSTRATE AND MANUFACTURING METHOD OF CERAMIC CAPACITOR

(71) Applicant: TAIYO YUDEN CO., LTD., Tokyo (JP)

(72) Inventors: Yasuyuki Inomata, Takasaki (JP); Yousuke Nakada, Takasaki (JP); Tetsuo Shimura, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 16/250,887

(22) Filed: Jan. 17, 2019

(65) Prior Publication Data
US 2019/0228911 A1   Jul. 25, 2019

(30) Foreign Application Priority Data
Jan. 24, 2018  (JP) .................. 2018-010033

(51) Int. Cl.
  *C04B 35/468* (2006.01)
  *H01G 4/30* (2006.01)
  (Continued)

(52) U.S. Cl.
  CPC ............. *H01G 4/30* (2013.01); *B32B 18/00* (2013.01); *C04B 35/468* (2013.01); *C04B 35/4682* (2013.01); *H01G 4/008* (2013.01); *H01G 4/1227* (2013.01); *C04B 2235/3206* (2013.01); *C04B 2235/3208* (2013.01);
  (Continued)

(58) Field of Classification Search
CPC ........ H01G 4/30; H01G 4/008; H01G 4/1227; B32B 18/00; C04B 35/4682; C04B 35/468; C04B 2235/3224; C04B 2235/3225; C04B 2235/79; C04B 2235/3239;
(Continued)

(56) References Cited

U.S. PATENT DOCUMENTS

| | | | |
|---|---|---|---|
| 6,485,672 B1 | 11/2002 | Nomura et al. | |
| 8,367,206 B2* | 2/2013 | Park .................... | C01G 23/003 423/598 |
| 2014/0057087 A1* | 2/2014 | Adachi .................. | H01G 4/30 428/212 |

FOREIGN PATENT DOCUMENTS

| JP | 2004217520 A | 8/2004 | |
|---|---|---|---|
| JP | 3568030 B * | 9/2004 | ............... H01G 4/12 |

* cited by examiner

*Primary Examiner* — Noah S Wiese
(74) *Attorney, Agent, or Firm* — Law Office of Katsuhiro Arai (57) ABSTRACT

A ceramic capacitor includes a multilayer structure, wherein a main component of dielectric layers is ceramic expressed by a general formula $A_mBO_3$ ($0.995 \leq m \leq 1.010$), wherein the dielectric layers include a rare earth element Re as a first sub-component by 2.0 mol to 5.0 mol when converted into $Re_2O_3/2$, include Mg as a second sub-component by 1.0 mol to 3.0 mol when converted into MgO, include V as a third sub-component by 0.05 mol to 0.25 mol when converted into $V_2O_5/2$, include Si as a fourth sub-component by 0.5 mol to 5.0 mol when converted into $SiO_2$, include an alkali earth metal element M as a fifth sub-component by 0.1 mol to 5.0 mol when converted into $MCO_3$, on a presumption that an amount of the ceramic is 100 mol, wherein a ratio Si/V is 30 or less.

6 Claims, 3 Drawing Sheets

(51) Int. Cl.
*H01G 4/12* (2006.01)
*H01G 4/008* (2006.01)
*B32B 18/00* (2006.01)

(52) U.S. Cl.
CPC .............. *C04B 2235/3213* (2013.01); *C04B 2235/3215* (2013.01); *C04B 2235/3224* (2013.01); *C04B 2235/3225* (2013.01); *C04B 2235/3236* (2013.01); *C04B 2235/3239* (2013.01); *C04B 2235/3418* (2013.01); *C04B 2235/5454* (2013.01); *C04B 2235/652* (2013.01); *C04B 2235/656* (2013.01); *C04B 2235/6584* (2013.01); *C04B 2235/663* (2013.01); *C04B 2235/79* (2013.01); *C04B 2235/94* (2013.01); *C04B 2237/346* (2013.01); *C04B 2237/66* (2013.01)

(58) Field of Classification Search
CPC .... C04B 2235/3215; C04B 2235/3206; C04B 2235/94; C04B 2235/3418; C04B 2237/66
See application file for complete search history.

CERAMIC CAPACITOR, CIRCUIT SUBSTRATE AND MANUFACTURING METHOD OF CERAMIC CAPACITOR

CROSS-REFERENCE TO RELATED APPLICATION

This application is based upon and claims the benefit of priority of the prior Japanese Patent Application No. 2018-010033, filed on Jan. 24, 2018, the entire contents of which are incorporated herein by reference.

FIELD

A certain aspect of the present invention relates to a ceramic capacitor, a circuit substrate and a manufacturing method of the ceramic capacitor.

BACKGROUND

Capacitors are used for smoothing of circuits or the like. For example, a high capacity of 10 g or more may be needed in smoothing capacitors used for inverter circuits. Electrolytic capacitors, film capacitors and so on that are capable of achieving a large capacity are used as smoothing capacitors for inverter circuits.

However, when semiconductor such as SiC (silicon carbide) or GaN (gallium nitride) is used as next generation power semiconductor instead of Si, it is possible to enlarge a carrier frequency. It is therefore possible to reduce a necessary capacity of the smoothing capacitor. And so, it is thought that the ceramic capacitors are sufficiently used as smoothing capacitors achieved by the electrolytic capacitors or the film capacitors. And, it is expected that the smoothing capacitors are used at a high temperature of 125 degrees C. or more. Instead, it is thought the smoothing capacitors cannot withstand at the high temperature unless the smoothing capacitors are the ceramic capacitors.

The ceramic capacitors are classified into Class 1 and Class 2. The ceramic capacitors of Class 1 use paraelectrics. Therefore, a dielectric constant of the ceramic capacitors of Class 1 is low. Even if the capacity needed for a smoothing circuit is reduced, the number of parallelized ceramic capacitors is large in order to secure the capacity and the size of the ceramic capacitor itself is enlarged. Therefore, the ceramic capacitors of Class 1 are not preferable. The ceramic capacitors of Class 2 use ferroelectrics such as $BaTiO_3$. The dielectric constant of Class 2 is larger than that of Class 1 by one digit to two digit. It is therefore possible to secure the capacity. However, when the ceramic capacitors of Class 2 are used as a smoothing capacitor, a material and product design in which DC bias characteristic is considered are needed. For example, Japanese Patent Application Publication No. 2004-217520 discloses a dielectric material achieving preferable DC bias characteristic.

SUMMARY OF THE INVENTION

The present invention has a purpose of providing a ceramic capacitor and a circuit substrate that are capable of achieving a high effective capacity, preferable DC bias characteristic, preferable high temperature characteristic and a high yield and a manufacturing method of the ceramic capacitor.

According to an aspect of the present invention, there is provided a ceramic capacitor including: a multilayer structure having a structure in which each of a plurality of dielectric layers and each of a plurality of internal electrode layers are alternately stacked, wherein a main component of the plurality of dielectric layers is ceramic having a perovskite structure that includes Ba and Ti and is expressed by a general formula $A_mBO_3$ ($0.995 \leq m \leq 1.010$), wherein the plurality of dielectric layers include a rare earth element Re which is at least one of Y, Gd, Tb, Dy and Ho as a first sub-component by 2.0 mol to 5.0 mol when converted into $Re_2O_3/2$, include Mg as a second sub-component by 1.0 mol to 3.0 mol when converted into MgO, include V as a third sub-component by 0.05 mol to 0.25 mol when converted into $V_2O_5/2$, include Si as a fourth sub-component by 0.5 mol to 5.0 mol when converted into $SiO_2$, include an alkali earth metal element M which is at least one of Ba, Sr and Ca as a fifth sub-component by 0.1 mol to 5.0 mol when converted into $MCO_3$, on a presumption that an amount of the ceramic is 100 mol, wherein a ratio Si/V which is a ratio of the fourth sub-component with respect to the third sub-component is 30 or less.

According to an aspect of the present invention, there is provided a manufacturing method of a ceramic capacitor including: forming a green sheet by adding a rare earth element Re which is at least one of Y, Gd, Tb, Dy and Ho as a first sub-component by 2.0 mol to 5.0 mol when converted into $Re_2O_3/2$, adding Mg as a second sub-component by 1.0 mol to 3.0 mol when converted into MgO, adding V as a third sub-component by 0.05 mol to 0.25 mol when converted into $V_2O_5/2$, adding Si as a fourth sub-component by 0.5 mol to 5.0 mol when converted into $SiO_2$, adding an alkali earth metal element M which is at least one of Ba, Sr and Ca as a fifth sub-component by 0.1 mol to 5.0 mol when converted into $MCO_3$, to ceramic powders having a perovskite structure that includes Ba and Ti and is expressed by a general formula $A_mBO_3$ ($0.995 \leq m \leq 1.010$), on a presumption that an amount of the ceramic powder is 100 mol, a ratio Si/V which is a ratio of the fourth sub-component with respect to the third sub-component being 30 or less; providing a metal conductive paste for forming an internal electrode layer, on the green sheet; and firing the green sheet on which the metal conductive paste is provided.

DETAILED DESCRIPTION

For example, when the ceramic capacitors are used as a smoothing capacitor for an industrial inverter, approximately 2000 numbers of the ceramic capacitors of 3216 (1206 of EIA) shape products (3.2 mm×1.6 mm) are needed in order to achieve 10 g as an effective capacity at 450 V load, considering a withstand voltage. Approximately 80 numbers of the ceramic capacitors of 5750 (220 of EIA) shape products (5.7 mm×5.0 mm) of JIS are needed. When many ceramic capacitors are mounted, efficiency is bad and a large mount area is needed. And so, for example, it is effective that ceramic capacitors larger than 5750 shape are used. For example, one ceramic capacitor of 25 mm×30 mm can achieve an effective capacity of 10 g at 450 V load.

However, when a material on which DC bias characteristic is focused is used for a large size ceramic capacitor, capacity variation and warp after firing may occur and a yield may be reduced because of un evenness of sintering.

A description will be given of an embodiment with reference to the accompanying drawings.

Embodiment

Figure 1:
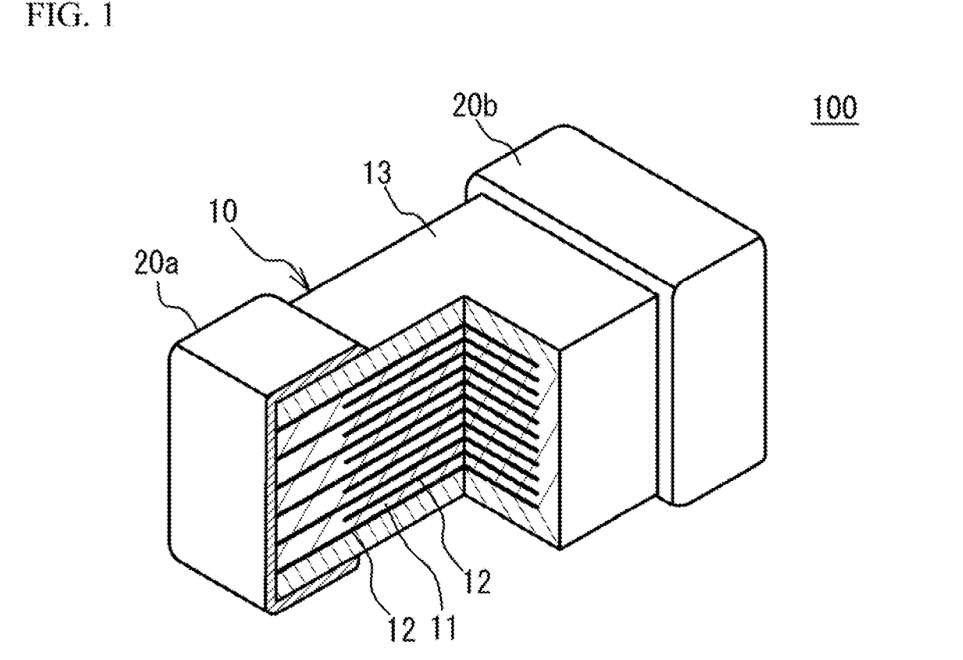
FIG. 1 illustrates a partial perspective view of a multilayer ceramic capacitor.

FIG. 1 illustrates a partial perspective view of a multilayer ceramic capacitor 100 in accordance with an embodiment. As illustrated in FIG. 1, the multilayer ceramic capacitor 100 includes a ceramic main body 10 having a rectangular parallelepiped shape, and a pair of external electrodes 20a and 20b that are respectively provided at two edge faces of the multilayer chip 10 facing each other. The ceramic main body 10 has an upper face and a lower face in a stacking direction. Two faces of the ceramic main body 10 other than the upper face, the lower face and the two edge faces of the ceramic main body 10 are referred to as side faces. The external electrodes 20a and 20b extend to the upper face, the lower face and the two side faces. However, the external electrodes 20a and 20b are spaced from each other.

The ceramic main body 10 has a structure designed to have dielectric layers 11 and internal electrode layers 12 alternately stacked. A main component of the dielectric layer 11 is a ceramic material acting as a dielectric material. A main component of the internal electrode layers 12 is a metal material such as a base metal material. End edges of the internal electrode layers 12 are alternately exposed to a first edge face of the ceramic main body 10 and a second edge face of the ceramic main body 10 that is different from the first edge face. In the embodiment, the first edge face faces with the second edge face. The external electrode 20a is provided on the first edge face. The external electrode 20b is provided on the second edge face. Thus, the internal electrode layers 12 are alternately conducted to the external electrode 20a and the external electrode 20b. Thus, the multilayer ceramic capacitor 100 has a structure in which a plurality of dielectric the layers 11 are stacked and each two of the dielectric layers 11 sandwich the internal electrode layer 12. In the ceramic main body 10, cover layers 13 cover the upper face and the lower face. A main component of the cover layer 13 is a ceramic material. For example, a main component material of the cover layer 13 is the same as that of the dielectric layer 11.

For example, the multilayer ceramic capacitor 100 may have a length of 1.6 mm, a width of 0.8 mm and a height of 0.8 mm. The multilayer ceramic capacitor 100 may have a length of 2.0 mm, a width of 1.25 mm and a height of 1.25 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. The multilayer ceramic capacitor 100 may have a length of 5.7 mm, a width of 5.0 mm and a height of 2.5 mm. The multilayer ceramic capacitor 100 may have a length of 7.5 mm, a width of 6.3 mm and a height of 2.5 mm. However, the size of the multilayer ceramic capacitor 100 is not limited.

A main component of the internal electrode layers 12 is a base metal such as nickel (Ni), copper (Cu), tin (Sn) or the like. The internal electrode layers 12 may be made of a noble metal such as platinum (Pt), palladium (Pd), silver (Ag), gold (Au) or alloy thereof. The dielectric layers 11 and the cover layers 13 include Ba (barium) and Ti (titanium) and are mainly composed of a ceramic material that is expressed by a general formula $ABO_3$ and has a perovskite structure. The perovskite structure includes $ABO_{3-\alpha}$ having an off-stoichiometric composition.

In the multilayer ceramic capacitor 100 of the embodiment, the dielectric layers 11 include sub-components. Thus, the multilayer ceramic capacitor 100 achieves high effective capacity, preferable DC bias characteristic, preferable high temperature characteristic, and high yield. A description will be given of details of the sub components added to the dielectric layers 11.

A main component of the dielectric layers 11 is barium titanate ($BaTiO_3$) acting as feroelectronics. When "m" in a general formula $A_mBO_3$ expressing a perovskite structure of the barium titanate is excessively small, reduction resistance may be degraded. When "m" is excessively large, sintering characteristic may be degraded. And so, "m" is a value of $0.995 \leq m \leq 1.010$.

Next, as a first sub-component, the dielectric layers 11 include a rare earth element Re which is at least one of Y (yttrium), Gd (gadolinium), Tb (terbium), Dy (dysprosium) and Ho (holmium). These rare earth elements have a function of improving reliability of the multilayer ceramic capacitor 100, a function of optimizing a dielectric constant of the multilayer ceramic capacitor 100 and a function of achieving preferable DC bias characteristic. However, an amount of the rare earth element Re is excessively small, sufficiently preferable DC bias characteristic may not be necessarily achieved. On the other hand, sintering at an adequate temperature (for example 1260 degrees C. or less) is difficult because of increasing of unreacted different phases, and the dielectric layers 11 may not be necessarily obtained, when the amount of the rare earth element Re is excessively large. And so, a concentration of the rare earth element Re in the dielectric layers 11 has an upper limit and a lower limit. In concrete, the dielectric layers 11 include the rare earth element Re and the amount of the rare earth element Re is 2.0 mol to 5.0 mol when converted into $Re_2O_{3/2}$ on a presumption that the amount of the barium titanate acting as the main component of the dielectric layers 11 is 100 mol. "2.0 mol to 5.0 mol when converted into $Re_2O_{3/2}$" means 1.0 mol to 2.5 mol when converted into $Re_2O_3$. It is preferable that the dielectric layers 11 include 3.0 mol to 4.0 mol of the rare earth element Re when converted into $Re_2O_{3/2}$ on a presumption that the amount of the barium titanate is 100 mol.

Next, the dielectric layers 11 include Mg (magnesium) as a second sub-component. Mg has a function of controlling a micro structure and achieves preferable DC bias characteristic. However, when an amount of Mg is excessively small, sufficiently preferable DC bias characteristic may not be necessarily achieved. On the other hand, when the amount of Mg is excessively large, existence of the different phases cannot be ignored and variation may occur in the capacity. And so, a concentration of Mg in the dielectric layers 11 has an upper limit and a lower limit. In concrete, the dielectric layers 11 include Mg and the amount of Mg is 1.0 mol to 3.0 mol when converted into MgO on a presumption that the amount of the barium titanate acting as the main component of the dielectric layers 11 is 100 mol. It is preferable that the dielectric layers 11 include 1.5 mol to 2.5 mol of Mg when converted into MgO on a presumption that the amount of the barium titanate acting as the main component of the dielectric layers 11 is 100 mol.

Next, the dielectric layers 11 include V (vanadium) as a third sub-component. V has a function of improving reliability of the multilayer ceramic capacitor 100 and achieves preferable high temperature load characteristic. However, an amount of V is excessively small, sufficiently preferable high temperature load characteristic may not be necessarily achieved. On the other hand, preferable high temperature insulation resistance may not be necessarily achieved because of increasing of donor electron, variation may occur in the capacity and preferable high temperature load characteristic may not be necessarily achieved, when the amount of V is excessively large. And so, a concentration of V in the dielectric layers 11 has an upper limit and a lower limit. In concrete, the dielectric layers 11 include V and an amount of V is 0.05 mol to 0.25 mol when converted into $V_2O_5/2$ on a presumption that the amount of barium titanate acting as the main component of the dielectric layers 11 is 100 mol. "0.05 mol to 0.25 mol when converted into $V_2O_5/2$" means 0.025 mol to 0.125 mol when converted into $V_2O_5$. It is preferable that the dielectric layers 11 include 0.1 mol to 0.2 mol of V when converted into $V_2O_5$ on a presumption that the amount of the barium titanate acting as the main component of the dielectric layers 11 is 100 mol.

Next, the dielectric layers 11 include Si (silicon) as a fourth sub-component. Si acts as a sintering assistant and achieves preferable sintering. However, when an amount of Si is excessively small, sintering at an adequate temperature (for example 1260 degrees C. or less) is difficult, and the dielectric layers 11 may not be necessarily formed. On the other hand, warping may occur in the dielectric layers 11 because of an excessively large amount of liquid phases and variation of sintering, and preferable high temperature load characteristic may not be necessarily achieved, when the amount of Si is excessively large. And so, a concentration of Si in the dielectric layers 11 has an upper limit and a lower limit. In concrete, the dielectric layers 11 include Si and the amount of Si is 0.5 mol to 5.0 mol when converted into $SiO_2$ on a presumption that the amount of the barium titanate acting as the main component of the dielectric layers 11 is 100 mol. It is preferable that the dielectric layers 11 include 1.0 mol to 2.5 mol of Si when converted into $SiO_2$ on a presumption that the amount of the barium titanate acting as the main component of the dielectric layers 11 is 100 mol.

Next, as a fifth sub-component, the dielectric layers 11 include an alkali earth metal element M which is at least one of Ba, Sr (strontium) and Ca (calcium). The alkali earth metal element M acts together with the Si component, has a function of securing stable sintering, achieves preferable DC bias characteristic and suppresses variation of the capacity. However, preferable DC bias characteristic may not be necessarily achieved and variation may occur in the capacity, when an amount of the alkali earth metal element M is excessively small. On the other hand, sintering at an adequate temperature (for example 1260 degrees C. or less) is difficult and the dielectric layers 11 may not be necessarily formed because an adequate amount of liquid phases is not formed, when the amount of the alkali earth metal element M is excessively large. And so, a concentration of the alkali earth metal element M in the dielectric layers 11 has an upper limit and a lower limit. In concrete, the dielectric layers 11 include the alkali earth metal element M and the amount of the alkali earth metal element M is 0.1 mol to 5.0 mol when converted into $MCO_3$ (carbonate of M) on a presumption that the amount of the barium titanate acting as the main component of the dielectric layers 11 is 100 mol. It is preferable that the dielectric layers 11 include 0.5 mol to 5.0 mol of the alkali earth metal element M when converted into $MCO_3$ on a presumption that the amount of the barium titanate acting as the main component of the dielectric layers 11 is 100 mol.

Next, when the concentration of Si is excessively high with respect to the concentration of V in the dielectric layers 11, variation may occur in the capacity and warping may occur. And so, in the dielectric layers 11, a ratio Si/V which is a ratio of the fourth sub-component with respect to the third sub-component has an upper limit. In concrete, Si/V is 30 or less in the dielectric layers 11. It is preferable that Si/V is 20 or less. It is more preferable that Si/V is 10 or less.

When the amount of the first to fifth sub-component is regulated in the dielectric layers 11 as mentioned above, it is possible to achieve high effective capacity, preferable DC bias characteristic, preferable high temperature characteristic, and high yield. A main component of the ceramic material of the cover layer 13 is the same as the main component of the dielectric layers 11. It is preferable that the amount of the first to fifth sub-component is regulated in the cover layer 13, as well as the dielectric layers 11.

The dielectric layer 11 may include at least one of Zr (zirconium) and Hf (hafnium) as a sixth sub-component, in addition to the first to fifth sub-component. For example, the dielectric layers 11 may include the sixth sub-component and the amount of the sixth sub-component may be 0.02 mol to 5.0 mol when converted into $ZrO_2$ and $HfO_2$ on a presumption that the amount of the barium titanate acting as the main component of the dielectric layers 11 is 100 mol.

The dielectric layers 11 may include at least one of Al (aluminum) and B (boron) as a seventh sub-component in addition to the first to fifth sub-component. For example, the dielectric layers 11 may include the seventh sub-component and the amount of the seventh sub-component may be 0.05 mol to 1.0 mol when converted into $B_2O_3/2$ and $Al_2O_3/2$ on a presumption that the amount of the barium titanate acting as the main component of the dielectric layers 11 is 100 mol.

Unevenness of the sintering, the variation of the capacity and warping after the firing are suppressed and the yield is improved, when the concentrations of the first to fifth sub-components in the dielectric layers 11 are regulated as mentioned above. The effect is specifically large, when the multilayer ceramic capacitor 100 has a large size. For example, the effect is specifically large, when the ceramic main body 10 has the parallelepiped rectangular shape of which at least two sides crossing at a right angle have a length of 10 mm or more.

In the dielectric layers 11, the micro structure is unstable, and desirable characteristic and desirable reliability may not be necessarily achieved, when the average crystal grain diameter is excessively small. In the dielectric layers 11, high reliability may not be necessarily achieved because of reduction of the number of the crystal grain boundaries, when the average crystal grain diameter is excessively large. And so, it is preferable that the average crystal grain diameter has an upper limit and a lower limit. In concrete, it is preferable that the average crystal grain diameter in the dielectric layers 11 is 100 nm or more and 300 nm or less.

Figure 2:
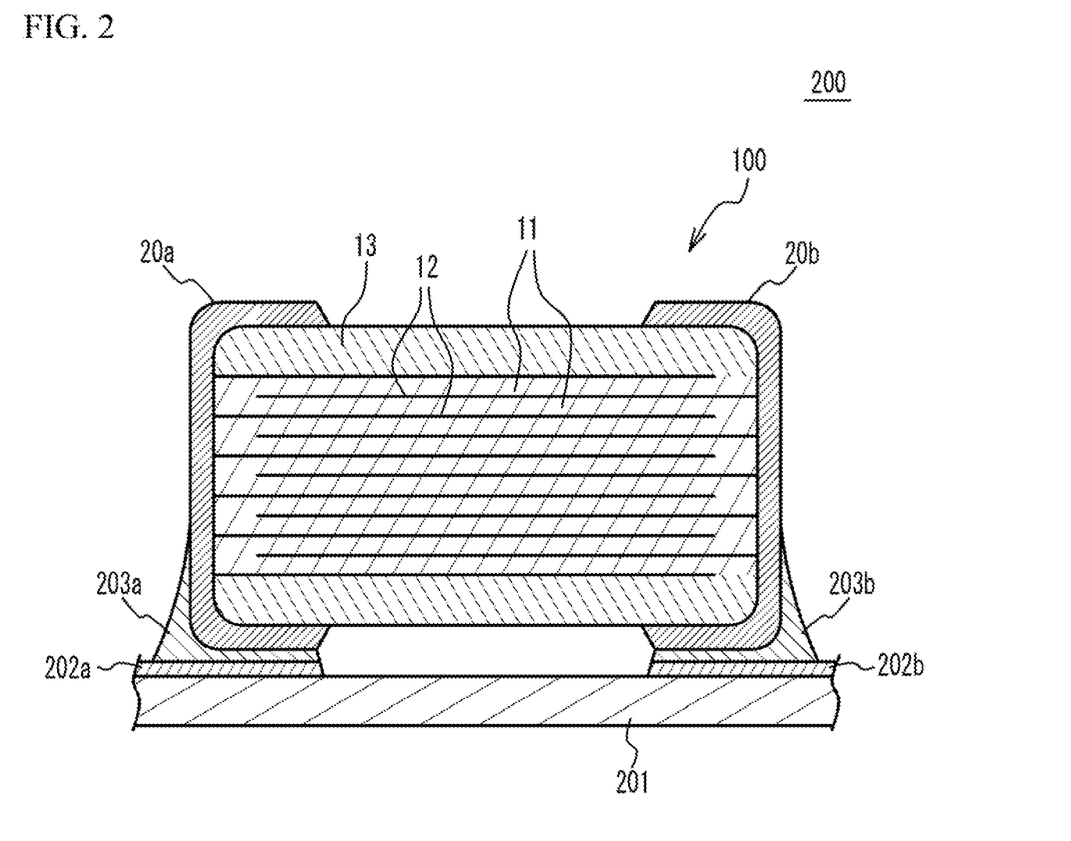
FIG. 2 illustrates a circuit substrate.

FIG. 2 illustrates a circuit substrate 200. As illustrated in FIG. 2, the circuit substrate 200 has a structure in which the multilayer ceramic capacitor 100 is mounted on a substrate 201. A wiring pattern 202a, a wiring pattern 202b and so on are provided on a mounting face of the substrate 201. The external electrode 20a is connected to the wiring pattern 202a via a solder 203a and is electrically coupled with the wiring pattern 202a. The external electrode 20b is connected to the wiring pattern 202b via a solder 203b and is electrically coupled with the wiring pattern 202b. In this manner, the multilayer ceramic capacitor 100 may be mounted on the substrate 201.

Figure 3:
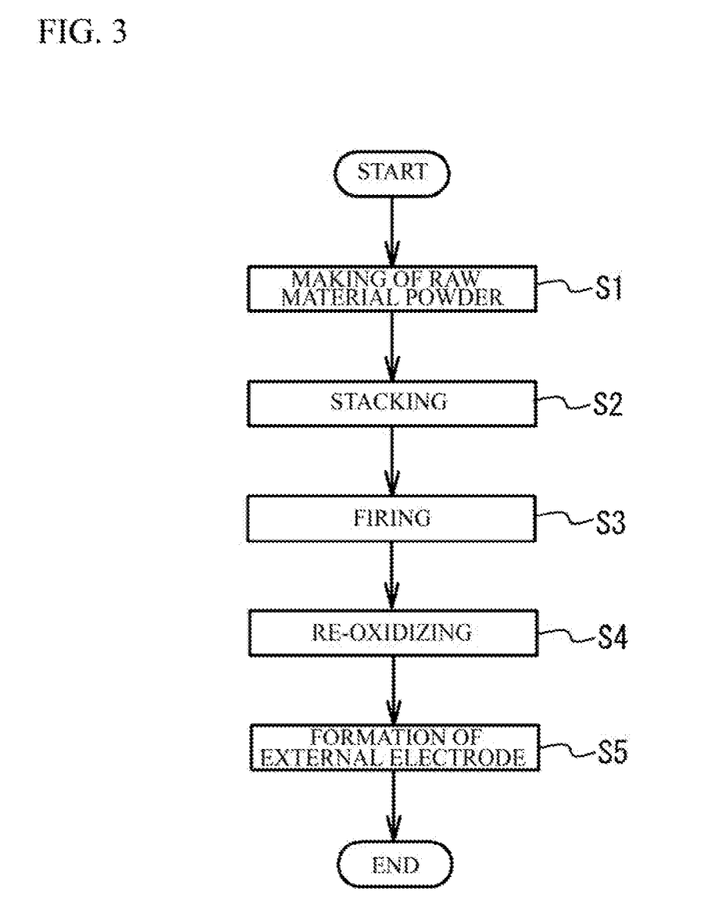
FIG. 3 illustrates a manufacturing method of a multilayer ceramic capacitor.

Next, a description will be given of a manufacturing method of the multilayer ceramic capacitor 100. FIG. 3 illustrates a manufacturing method of the multilayer ceramic capacitor 100.

(Making process of a raw material powder) First, a dielectric material for forming the dielectric layer 11 is prepared. Generally, an A site element and a B site element are included in the dielectric layer 11 in a sintered phase of grains of $BaTiO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. The titanium material and the barium material are reacted so that "m" in the general formula $A_mBO_3$ expressing the perovskite structure of barium titanate satisfies $0.995 \leq m \leq 1.010$. Various methods can be used as a synthesizing method of the ceramic structuring the dielectric layer 11. For example, a solid-phase method, a sol-gel method, a hydrothermal method or the like can be used.

Additive compound may be added to the resulting ceramic powders, in accordance with purposes. The additive compound may be an oxide of Mg, Mn (manganese), V, Cr (chromium) or a rare earth element (Y, Sm (samarium), Eu (europium), Gd, Tb, Dy, Ho, Er (erbium), Tm (thulium) and Yb (ytterbium)), or an oxide of Co (cobalt), Ni, Li (lithium), B, Na (sodium), K (potassium) and Si, or glass.

In the embodiment, the rare earth element Re which is at least one of Y, Gd, Tb, Dy and Ho is added as the first sub-component by 2.0 mol to 5.0 mol when converted into $Re_2O_3/2$, Mg is added as the second sub-component by 1.0 mol to 3.0 mol when converted into MgO, V is added as the third sub-component by 0.05 mol to 0.25 mol when converted into $V_2O_5/2$, Si is added as the fourth sub-component by 0.5 mol to 5.0 mol when converted into $SiO_2$, the alkali earth metal element M which is at least one of Ba, Sr and Ca is added as the fifth sub-component by 0.1 mol to 5.0 mol when converted into $MCO_3$, and the ratio Si/V which is the ratio of the fourth sub-component with respect to the third sub-component is 30 or less, on a presumption that the amount of the barium titanate is 100 mol.

For example, compound including the additive compound is mixed with the barium titanate grains. The resulting barium titanate grains are calcined in a temperature range of 820 degrees C. to 1150 degrees C. Then, the ceramic grains are wet-blended with the additive compound. After that, the ceramic grains with the additive compound are dried and crushed. And, desirable ceramic powders are prepared. For example, the grain growth is remarkable, and desirable characteristic and desirable reliability may not be necessarily achieved, when the average grain diameter of the ceramic powders is excessively small. When the average grain diameter of the ceramic powders is excessively large, high reliability may not be necessarily achieved because of reduction of the number of grain boundaries. And so, it is preferable that the average grain diameter of the ceramic powders has an upper limit and a lower limit. In concrete, it is preferable that the average grain diameter is 100 nm or more and 300 nm or less. For example, the resulting ceramic powders may be crushed and a grain diameter of the ceramic powders may be adjusted if necessary. Alternatively, the grain diameter may be adjusted by combining a classification process. With the processes, the dielectric material is obtained.

(Stacking Process) Next, a binder such as polyvinyl butyral (PVB) resin, an organic solvent such as ethanol or toluene, and a plasticizer are added to the resulting dielectric material and are wet-blended. With use of the resulting slurry, a strip-shaped dielectric green sheet with a thickness of 10 μm to 40 μm is coated on a base material by, for example, a die coater method or a doctor blade method, and then dried. Alternatively, a green sheet having a desirable thickness may be formed by stacking a plurality of thin green sheets.

Then, a pattern of the internal electrode layer 12 is provided on the surface of the dielectric green sheet by printing a metal conductive paste including an organic binder with use of screen printing or gravure printing. A plurality of the patterns are alternately extracted to the pair of external electrodes. The metal conductive paste includes a ceramic grain acting as a co-material. The main component of the ceramic grain is not limited. It is preferable that the main component is the same as the main component ceramic of the dielectric layers 11. For example, $BaTiO_3$ having an average grain diameter of 50 nm or less may be evenly dispersed.

A cover sheet is formed by stacking a plurality of the green sheets. A plurality of the pattern-formed sheets are stacked on the cover sheet. And, another cover sheet is stacked on the plurality of the pattern-formed sheets by stacking a plurality of the green sheets. An obtained multilayer structure is stamped into a predetermined size. And a compact is formed.

(Firing process) After that, the binder is removed from the compact in $N_2$ atmosphere of 250 degrees C. to 500 degrees C. The resulting compact is fired for 10 minutes to 2 hours in a reductive atmosphere of which an oxygen partial pressure is $10^{-5}$ to $10^{-8}$ atm in a temperature range of 1100 degrees C. to 1300 degrees C. And the multilayer ceramic capacitor 100 is obtained.

(Re-oxidizing process) After that, the multilayer ceramic capacitor 100 may be subjected to a re-oxidizing process in $N_2$ gas atmosphere in a temperature range of 600 degrees C. to 1000 degrees C.

(Forming of external electrodes) After that, a conductive paste for forming the external electrodes 20a and 20b is coated on two edge faces of the obtained sintered structure to which the internal electrode layers are exposed. Cu or the like may be used as the conductive paste. The conductive paste is fired in $N_2$ atmosphere at a temperature (for example, 800 degrees C. to 900 degrees C.) lower than the firing temperature for forming the sintered structure. Thus, the external electrodes 20a and 20b are formed. After that, a metal such as Cu, Ni, Sn or the like may be coated by plating.

In the embodiment, the rare earth element Re which is at least one of Y, Gd, Tb, Dy and Ho is added as the first sub-component by 2.0 mol to 5.0 mol when converted into $Re_2O_3/2$, on a presumption that the amount of the barium titanate is 100 mol. Mg is added as the second sub-component by 1.0 mol to 3.0 mol when converted into MgO. V is added as the third sub-component by 0.05 mol to 0.25 mol when converted into $V_2O_5/2$. Si is added as the fourth sub-component by 0.5 mol to 5.0 mol when converted into $SiO_2$. The alkali earth metal element M which is at least one of Ba, Sr and Ca is added as the fifth sub-component by 0.1 mol to 5.0 mol when converted into $MCO_3$. And the ratio Si/V which is the ratio of the fourth sub-component with respect to the third sub-component is 30 or less. Thus, the multilayer ceramic capacitor 100 achieves high effective capacity, preferable DC bias characteristic, preferable high temperature characteristic, and high yield.

The green sheet may include at least one of Zr and Hf and the total amount of Zr and Hf may be 0.02 mol to 5.0 mol when converted into $ZrO_2$ and $HfO_2$ on a presumption that the amount of the barium titanate is 100 mol. The green sheet may include at least one of Al and B and the total amount of Al and B may be 0.05 mol to 1.0 mol when converted into $B_2O_3/2$ and $Al_2O_3/2$ on a presumption that the amount of the barium titanate is 100 mol.

The embodiment focuses on multilayer ceramic capacitor. However, the embodiment may be applied to a ceramic capacitor having a single dielectric layer.

EXAMPLES

The multilayer ceramic capacitor was measured. And characteristic of the multilayer ceramic capacitor was measured.

$Ba_mTiO_3$ (m=1.005) powder of which a particle diameter was 150 nm was prepared as the main component ceramic of the dielectric layer 11 and the cover layer 13. $Gd_2O_3$, $Tb_2O_3$, $Dy_2O_3$, $Ho_2O_3$ and $Y_2O_3$ were prepared as the rare earth element Re acting as the first sub-component. MgO was prepared as the second sub-component. $Y_2O_5$ was prepared as the third sub-component. $SiO_2$ was prepared as the fourth sub-component. $BaCO_3$, $SrO_3$ and $CaCO_3$ were prepared as the fifth sub-component.

The barium titanate powder and the first to fifth sub-components were weighed so that the ratio of the barium titanate powder and the first to fifth sub-components was a predetermined value. The resulting power was sufficiently wet-blended and crushed by a ball mil, and the dielectric materials was obtained. Next, as an organic binder, butyral was added to the resulting dielectric material. As a solvent, toluene or ethanol was added to the resulting dielectric material. And, slurry was obtained.

Example 1

In an example 1, Dy and Ho were added as the first sub-component by 1 mol and 1 mol when converted into $Re_2O_3/2$, Mg was added as the second sub-component by 1.8 mol when converted into MgO, V was added as the third sub-component by 0.15 mol when converted into $V_2O_5/2$, Si was added as the fourth sub-component by 2 mol when converted into $SiO_2$, Sr was added as the fifth sub-component by 2 mol when converted into $SrCO_3$, and Si/V was 13.3, on a presumption that the amount of barium titanate was 100 mol.

Example 2

In an example 2, Gd and Y were added as the first sub-component by 2 mol and 1 mol when converted into $Re_2O_3/2$, Mg was added as the second sub-component by 3 mol when converted into MgO, V was added as the third sub-component by 0.15 mol when converted into $V_2O_5/2$, Si was added as the fourth sub-component by 1.5 mol when converted into $SiO_2$, Ba was added as the fifth sub-component by 2 mol when converted into $BaCO_3$, and Si/V was 10.0, on a presumption that the amount of barium titanate was 100 mol.

Example 3

In an example 3, Tb and Y were added as the first sub-component by 2 mol and 1 mol when converted into $Re_2O_3/2$, Mg was added as the second sub-component by 3 mol when converted into MgO, V was added as the third sub-component by 0.15 mol when converted into $V_2O_5/2$, Si was added as the fourth sub-component by 1.5 mol when converted into $SiO_2$, Ba was added as the fifth sub-component by 2 mol when converted into $BaCO_3$, and Si/V was 10.0, on a presumption that the amount of barium titanate was 100 mol.

Example 4

In an example 4, Dy and Y were added as the first sub-component by 2 mol and 1 mol when converted into $Re_2O_3/2$, Mg was added as the second sub-component by 2 mol when converted into MgO, V was added as the third sub-component by 0.2 mol when converted into $V_2O_5/2$, Si was added as the fourth sub-component by 2 mol when converted into $SiO_2$, Ca was added as the fifth sub-component by 2 mol when converted into $CaCO_3$, and Si/V was 10.0, on a presumption that the amount of barium titanate was 100 mol.

Example 5

In an example 5, Ho and Y were added as the first sub-component by 2 mol and 1 mol when converted into $Re_2O_3/2$, Mg was added as the second sub-component by 2 mol when converted into MgO, V was added as the third sub-component by 0.2 mol when converted into $V_2O_5/2$, Si was added as the fourth sub-component by 2 mol when converted into $SiO_2$, Ca was added as the fifth sub-component by 2 mol when converted into $CaCO_3$, and Si/V was 10.0, on a presumption that the amount of barium titanate was 100 mol.

Example 6

In an example 6, Dy and Ho were added as the first sub-component by 2 mol and 1 mol when converted into $Re_2O_3/2$, Mg was added as the second sub-component by 2 mol when converted into MgO, V was added as the third sub-component by 0.12 mol when converted into $V_2O_5/2$, Si was added as the fourth sub-component by 1.5 mol when converted into $SiO_2$, Sr was added as the fifth sub-component by 1 mol when converted into $SrCO_3$, and Si/V was 12.5, on a presumption that the amount of barium titanate was 100 mol.

Example 7

In an example 7, Dy was added as the first sub-component by 3 mol when converted into $Re_2O_3/2$, Mg was added as the second sub-component by 2.5 mol when converted into MgO, V was added as the third sub-component by 0.15 mol when converted into $V_2O_5/2$, Si was added as the fourth sub-component by 2 mol when converted into $SiO_2$, Ba and Sr were added as the fifth sub-component by 1 mol and 1 mol when converted into $MCO_3$, and Si/V was 13.3, on a presumption that the amount of barium titanate was 100 mol.

Example 8

In an example 8, Ho was added as the first sub-component by 3 mol when converted into $Re_2O_3/2$, Mg was added as the second sub-component by 2.5 mol when converted into MgO, V was added as the third sub-component by 0.15 mol when converted into $V_2O_5/2$, Si was added as the fourth sub-component by 2 mol when converted into $SiO_2$, Ba and Ca were added as the fifth sub-component by 1 mol and 1 mol when converted into $MCO_3$, and Si/V was 13.3, on a presumption that the amount of barium titanate was 100 mol.

Example 9

In an example 9, Y was added as the first sub-component by 3 mol when converted into $Re_2O_3/2$, Mg was added as the second sub-component by 2.5 mol when converted into MgO, V was added as the third sub-component by 0.15 mol when converted into $V_2O_5/2$, Si was added as the fourth sub-component by 2 mol when converted into $SiO_2$, Sr and Ca were added as the fifth sub-component by 1 mol and 1 mol when converted into $MCO_3$, and Si/V was 13.3, on a presumption that the amount of barium titanate was 100 mol.

Example 10

In an example 10, Gd and Dy were added as the first sub-component by 1 mol and 1 mol when converted into $Re_2O_3/2$, Mg was added as the second sub-component by 2 mol when converted into MgO, V was added as the third sub-component by 0.25 mol when converted into $V_2O_5/2$, Si was added as the fourth sub-component by 1.5 mol when converted into $SiO_2$, Ba was added as the fifth sub-component by 1.5 mol when converted into $BaCO_3$, and Si/V was 6.0, on a presumption that the amount of barium titanate was 100 mol.

Comparative Example 1

In a comparative example 1, Dy and Ho were added as the first sub-component by 4 mol and 2 mol when converted into $Re_2O_3/2$, Mg was added as the second sub-component by 2.2 mol when converted into MgO, V was added as the third sub-component by 0.15 mol when converted into $V_2O_5/2$, Si was added as the fourth sub-component by 2 mol when converted into $SiO_2$, Sr was added as the fifth sub-component by 1.5 mol when converted into $SrCO_3$, and Si/V was 13.3, on a presumption that the amount of barium titanate was 100 mol.

Comparative Example 2

In a comparative example 2, Dy was added as the first sub-component by 1.8 mol when converted into $Re_2O_3/2$, Mg was added as the second sub-component by 2.2 mol when converted into MgO, V was added as the third sub-component by 0.13 mol when converted into $V_2O_5/2$, Si was added as the fourth sub-component by 2 mol when converted into $SiO_2$, Sr was added as the fifth sub-component by 1 mol when converted into $SrCO_3$, and Si/V was 15.4, on a presumption that the amount of barium titanate was 100 mol.

Comparative Example 3

In a comparative example 3, Dy and Ho were added as the first sub-component by 2 mol and 2 mol when converted into $Re_2O_3/2$, Mg was added as the second sub-component by 0.8 mol when converted into MgO, V was added as the third sub-component by 0.15 mol when converted into $V_2O_5/2$, Si was added as the fourth sub-component by 2 mol when converted into $SiO_2$, Sr was added as the fifth sub-component by 1 mol when converted into $SrCO_3$, and Si/V was 13.3, on a presumption that the amount of barium titanate was 100 mol.

Comparative Example 4

In a comparative example 4, Dy and Ho were added as the first sub-component by 2 mol and 2 mol when converted into $Re_2O_3/2$, Mg was added as the second sub-component by 3.5 mol when converted into MgO, V was added as the third sub-component by 0.15 mol when converted into $V_2O_5/2$, Si was added as the fourth sub-component by 2 mol when converted into $SiO_2$, Sr was added as the fifth sub-component by 1.5 mol when converted into $SrCO_3$, and Si/V was 13.3, on a presumption that the amount of barium titanate was 100 mol.

Comparative Example 5

In a comparative example 5, Dy and Ho were added as the first sub-component by 2 mol and 2 mol when converted into $Re_2O_3/2$, Mg was added as the second sub-component by 2 mol when converted into MgO, V was added as the third sub-component by 0.04 mol when converted into $V_2O_5/2$, Si was added as the fourth sub-component by 0.75 mol when converted into $SiO_2$, Sr was added as the fifth sub-component by 1.5 mol when converted into $SrCO_3$, and Si/V was 18.8, on a presumption that the amount of barium titanate was 100 mol.

Comparative Example 6

In a comparative example 6, Dy and Ho were added as the first sub-component by 2 mol and 2 mol when converted into $Re_2O_3/2$, Mg was added as the second sub-component by 2 mol when converted into MgO, V was added as the third sub-component by 0.27 mol when converted into $V_2O_5/2$, Si was added as the fourth sub-component by 0.75 mol when converted into $SiO_2$, Sr was added as the fifth sub-component by 1 mol when converted into $SrCO_3$, and Si/V was 2.8, on a presumption that the amount of barium titanate was 100 mol.

Comparative Example 7

In a comparative example 7, Dy and Ho were added as the first sub-component by 2 mol and 1 mol when converted into $Re_2O_3/2$, Mg was added as the second sub-component by 1 mol when converted into MgO, V was added as the third sub-component by 0.1 mol when converted into $V_2O_5/2$, Si was added as the fourth sub-component by 0.4 mol when converted into $SiO_2$, Sr was added as the fifth sub-component by 1 mol when converted into $SrCO_3$, and Si/V was 4.0, on a presumption that the amount of barium titanate was 100 mol.

Comparative Example 8

In a comparative example 8, Dy and Ho were added as the first sub-component by 2 mol and 1 mol when converted into $Re_2O_3/2$, Mg was added as the second sub-component by 1.5 mol when converted into MgO, V was added as the third sub-component by 0.2 mol when converted into $V_2O_5/2$, Si was added as the fourth sub-component by 5.5 mol when converted into $SiO_2$, Sr was added as the fifth sub-component by 1 mol when converted into $SrCO_3$, and Si/V was 27.5, on a presumption that the amount of barium titanate was 100 mol.

Comparative Example 9

In a comparative example 9, Dy and Ho were added as the first sub-component by 2 mol and 1 mol when converted into $Re_2O_3/2$, Mg was added as the second sub-component by 1.5 mol when converted into MgO, V was added as the third sub-component by 0.12 mol when converted into $V_2O_5/2$, Si was added as the fourth sub-component by 1.5 mol when converted into $SiO_2$, the fifth sub-component was not added, and Si/V was 12.5, on a presumption that the amount of barium titanate was 100 mol.

Comparative Example 10

In a comparative example 10, Dy and Ho were added as the first sub-component by 2 mol and 1 mol when converted into $Re_2O_3/2$, Mg was added as the second sub-component by 1.5 mol when converted into MgO, V was added as the third sub-component by 0.12 mol when converted into $V_2O_5/2$, Si was added as the fourth sub-component by 1.5 mol when converted into $SiO_2$, Sr was added as the fifth sub-component by 6 mol when converted into $SrCO_3$, and Si/V was 12.5, on a presumption that the amount of barium titanate was 100 mol.

Comparative Example 11

In a comparative example 11, Dy and Ho were added as the first sub-component by 2 mol and 1 mol when converted into $Re_2O_3/2$, Mg was added as the second sub-component by 1.5 mol when converted into MgO, V was added as the third sub-component by 0.1 mol when converted into $V_2O_5/2$, Si was added as the fourth sub-component by 3.5 mol when converted into $SiO_2$, Sr was added as the fifth sub-component by 4 mol when converted into $SrCO_3$, and Si/V was 35.0, on a presumption that the amount of barium titanate was 100 mol.

Comparative Example 12

In a comparative example 12, Dy and Ho were added as the first sub-component by 2 mol and 1 mol when converted into $Re_2O_3/2$, Mg was added as the second sub-component by 1.5 mol when converted into MgO, V was added as the third sub-component by 0.15 mol when converted into $V_2O_5/2$, Si was added as the fourth sub-component by 5 mol when converted into $SiO_2$, Sr was added as the fifth sub-component by 5 mol when converted into $SrCO_3$, and Si/V was 33.3, on a presumption that the amount of barium titanate was 100 mol.

Table 1 shows added amounts of the first sub-component to the fifth sub-component of the examples 1 to 10 and the comparative examples 1 to 12. In Table 1, blanks means that no sub-component was intentionally added.

A dielectric green sheet having a thickness of 30 μm was formed from the slurry of the examples 1 to 10 and the comparative examples 1 to 12 by a doctor blade method. A paste for forming an internal electrode of which a main component was Ni was printed on the resulting green sheet. Thus, a pattern-formed sheet was formed. 600 numbers of the pattern-formed sheets were stacked on a cover sheet (50×green sheet). And, another cover sheet (50×green sheet) was stacked on the multilayer structure. After that, the resulting multilayer structure was crimped at 100 degrees C. to 120 degrees C.

And the resulting multilayer structure was cut into a predetermined shape. After degreasing process in a $N_2$ atmosphere, the resulting multilayer structure was fired at a temperature of 1230 degrees C. in a reductive atmosphere. In a temperature lowering process after the firing, an oxygen partial pressure was enlarged and a re-oxidation process was performed. Thus, the ceramic main body 10 was obtained. After that, a Cu external paste including glass frit was coated on the two edge faces of the ceramic main body 10. The Cu external paste was baked in a $N_2$ atmosphere. And, the multilayer ceramic capacitor 100 of which a size was 20 mm×30 mm×4 mm was obtained. The thickness of the dielectric layers 11 was 20 μm.

(Analysis) Each measurement test was performed with respect to the multilayer ceramic capacitors 100 of the examples 1 to 10 and the comparative examples 1 to 12.

(Test of dielectric constant and Tan δ) A temperature return process was performed for 1 hour at 150 degrees C. After 24 hours, the capacity and Tan δ of the multilayer ceramic capacitor 100 were measured by an LCR meter. The measurement condition was 120 Hz-0.5 Vrms. The relative dielectric constant $\varepsilon_r$ was calculated from the capacity C in accordance with the following formula (1) with use of an effective crossing area S, a stack number n, a thickness t of the dielectric layer 11 and a vacuum dielectric constant $\varepsilon_o$. The effective crossing area is a total area of facing areas of all pairs of the internal electrode layers 12 next to each other in a capacity region in which the internal electrode layers 12 that are connected to the different external electrode and are next to each other face with each other.

$$\varepsilon_r = (C \times t)/(\varepsilon_0 \times S \times n) \quad (1)$$

The capacity C of 100 samples was measured with respect to each of the examples 1 to 10 and each of the comparative examples 1 to 12. A percentage of the standard deviation of the capacity C of 100 samples with respect to the average capacity was treated as the variation of the capacity. The sample of which the obtained value was more than 1.5% was determined as NG.

(DC bias characteristic) The capacity changing rate was measured in accordance with the following formula (2) from the capacity C=200 V at which no-load capacity C0 and DC 200V were applied. The example or the comparative example of which the measured capacity changing rate was less than −50% was determined as NG.

$$\text{Capacity changing rate} = (C200V - C0)/C0 \times 100 \quad (2)$$

DC 450 V was applied for 60 seconds at 125 degrees C. The insulation resistance value was measured by an insulation resistance measurer. The determination standard of the insulation was 1 MΩ. The example or the comparative example of which the insulation resistance value was less than 1 MΩ was determined as NG.

(product warp evaluation) 100 samples of each of the examples 1 to 10 and the comparative examples 1 to 12 were passed through a clearance gauge of 4.3 mm. The example or the comparative example of which one or more samples could not pass through the clearance gauge was determined as NG.

(High temperature load test) DC 540 V was applied to 100 samples of each of the examples 1 to 10 and the comparative examples 1 to 12 for 1000 hours at 125 degrees C. After the test, the temperature return process was performed under no load four 1 hour at 150 degrees C. After 24 hours, the capacity, Tan δ, the insulation resistance (a value obtained when DC 450 V was applied for 60 seconds), and the external appearance were confirmed. The reliability was determined as OK, when the capacity was within ±10% with respect to the initial value, Tan δ was within ±1% with respect to the initial value, the degradation of the insulation resistance was one digit or less in comparison to the initial value, and there were no abnormality such as a crack in the external appearance. When there was one or more abnormalities, the reliability was determined as NG.

Table 2 shows results of each measurement test with respect to the examples 1 to 10 and the comparative examples 1 to 12. In Table 2, the sintering temperature of the firing process was also indicated. In the comparative example 1, the sintering at 1260 degrees C. or less was difficult. It is thought that this was because the amount of the rare earth element Re was more than 5.0 mol when converted into $Re_2O_3/2$. Next, in the comparative example 2, preferable DC bias was not achieved. It is thought that this was because the amount of the rare earth element Re was less than 2.0 mol when converted into $Re_2O_3/2$.

Next, in the comparative example 3, preferable DC bias characteristic was not achieved. It is thought that this was because the amount of Mg was less than 1.0 mol when converted into MgO. Next, in the comparative examples 4, the capacity variation was determined as NG It is thought that this was because the amount of Mg was more than 3.0 mol when converted into MgO. Next, in the comparative example 5, the high temperature load test was determined as NG It is thought that this was because the amount of V was less than 0.05 mol when converted into $V_2O_5/2$. Next, in the comparative example 6, the high temperature insulation resistance, the capacity variation and the high temperature load tests were determined as NG It is thought that this was because the amount of V was more than 0.25 mol when converted into $V_2O_5/2$.

Next, in the comparative example 7, the sintering at 1260 degrees C. or less was difficult. It is thought that this was because the amount of Si was less than 0.5 mol when converted into $SiO_2$. Next, in the comparative example 8, the warp test and the high temperature load test were determined as NG It is thought that this was because the amount of Si was more than 5.0 mol when converted into $SiO_2$. Next, in the comparative example 9, preferable bias characteristic was not achieved, and the capacity variation was determined as NG It is thought that this was because the alkali earth metal element M was not added. Next, in the comparative example 10, the sintering at 1260 degrees C. or less was difficult. It is thought that this was because the amount of the alkali earth metal element M was more than 5.0 mol when converted into $MCO_3$. Next, in the comparative examples 11 and 12, the capacity variation and the warp were determined as NG It is thought that this was because Si/V was more than 30.

On the other hand, in any of the examples 1 to 10, preferable DC bias was achieved. And no examples were determined as NG in the measurement tests. The high dielectric constant was achieved. And Tan δ was small. Therefore, the high effective capacity, the preferable DC bias characteristic, the preferable high temperature characteristic, and the high yield were achieved. It is thought that this was because the main component of the dielectric layer 11 was barium titanate acting as ferroelectric material, "m" in the general formula $A_mBO_3$ expressing the perovskite structure of barium titanate satisfies 0.995≤m≤1.010, the rare earth element Re was added by 2.0 mol to 5.0 mol when converted into $Re_2O_3/2$, Mg was added by 1.0 mol to 3.0 mol when converted into MgO, V was added by 0.05 mol to 0.25 mol when converted into $V_2O_5/2$, Si was added by 0.5 mol to 5.0 mol when converted into $SiO_2$, the alkali earth metal element M was added by 0.1 mol to 5.0 mol when converted into $MCO_3$, and the ratio Si/V was 30 or less, on a presumption that the amount of the barium titanate was 100 mol.

TABLE 1

| | 1ST SUB-COMPONENT $Re_2O_3$ | | | | | 2ND SUB-COMPONENT MgO | 3RD SUB-COMPONENT $V_2O_5$ | 4TH SUB-COMPONENT $SiO_2$ | 5TH SUB-COMPONENT $MCO_3$ | | | |
|---|---|---|---|---|---|---|---|---|---|---|---|---|
| | Gd | Tb | Dy | Ho | Y | MgO | $V_2O_5$ | $SiO_2$ | Ba | Sr | Ca | Si/V |
| EXAMPLE 1 | | | 1 | 1 | | 1.8 | 0.15 | 2 | | 2 | | 13.3 |
| EXAMPLE 2 | 2 | | | | 1 | 3 | 0.15 | 1.5 | 2 | | | 10.0 |
| EXAMPLE 3 | | 2 | | | 1 | 3 | 0.15 | 1.5 | 2 | | | 10.0 |
| EXAMPLE 4 | | | 2 | | 1 | 2 | 0.2 | 2 | | | 2 | 10.0 |
| EXAMPLE 5 | | | | 2 | 1 | 2 | 0.2 | 2 | | | 2 | 10.0 |
| EXAMPLE 6 | | | 2 | 1 | | 2 | 0.12 | 1.5 | | 1 | | 12.5 |
| EXAMPLE 7 | | | 3 | | | 2.5 | 0.15 | 2 | 1 | 1 | | 13.3 |
| EXAMPLE 8 | | | | 3 | | 2.5 | 0.15 | 2 | 1 | | 1 | 13.3 |
| EXAMPLE 9 | | | | | 3 | 2.5 | 0.15 | 2 | | 1 | 1 | 13.3 |
| EXAMPLE 10 | 1 | | 1 | | 1 | 2 | 0.25 | 1.5 | 1.5 | | | 6.0 |
| COMPARATIVE EXAMPLE 1 | | | 4 | 2 | | 2.2 | 0.15 | 2 | | 1.5 | | 13.3 |
| COMPARATIVE EXAMPLE 2 | | | 1.8 | | | 2.2 | 0.13 | 2 | | 1 | | 15.4 |
| COMPARATIVE EXAMPLE 3 | | | 2 | 2 | | 0.8 | 0.15 | 2 | | 1 | | 13.3 |
| COMPARATIVE EXAMPLE 4 | | | 2 | 2 | | 3.5 | 0.15 | 2 | | 1.5 | | 13.3 |
| COMPARATIVE EXAMPLE 5 | | | 2 | 2 | | 2 | 0.04 | 0.75 | | 1.5 | | 18.8 |
| COMPARATIVE EXAMPLE 6 | | | 2 | 2 | | 2 | 0.27 | 0.75 | | 1 | | 2.8 |
| COMPARATIVE EXAMPLE 7 | | | 2 | 1 | | 1 | 0.1 | 0.4 | | 1 | | 4.0 |
| COMPARATIVE EXAMPLE 8 | | | 2 | 1 | | 1.5 | 0.2 | 5.5 | | 1 | | 27.5 |
| COMPARATIVE EXAMPLE 9 | | | 2 | 1 | | 1.5 | 0.12 | 1.5 | | — | | 12.5 |
| COMPARATIVE EXAMPLE 10 | | | 2 | 1 | | 1.5 | 0.12 | 1.5 | | 6 | | 12.5 |
| COMPARATIVE EXAMPLE 11 | | | 2 | 1 | | 1.5 | 0.1 | 3.5 | | 4 | | 35.0 |

TABLE 1-continued

| | 1ST SUB-COMPONENT $Re_2O_3$ | | | | 2ND SUB-COMPONENT | 3RD SUB-COMPONENT | 4TH SUB-COMPONENT | 5TH SUB-COMPONENT $MCO_3$ | | | |
|---|---|---|---|---|---|---|---|---|---|---|---|
| | Gd | Tb | Dy | Ho | Y | MgO | $V_2O_5$ | $SiO_2$ | Ba | Sr | Ca | Si/V |
| COMPARATIVE EXAMPLE 12 | | | 2 | 1 | | 1.5 | 0.15 | 5 | | 5 | | 33.3 |

TABLE 2

| | SINTERING TEMPERATURE | DIELECTRIC CONSTANT | Tan δ (%) | DC BIAS CHARACTERISTIC | HIGH TEMPERATURE INSULATION RESISTANCE | CAPACITY VARIATION | WARP | HIGH TEMPERATURE LOAD TEST |
|---|---|---|---|---|---|---|---|---|
| EXAMPLE 1 | 1230° C. | 1500 | 0.7 | −47% | | | | |
| EXAMPLE 2 | 1220° C. | 1550 | 0.6 | −49% | | | | |
| EXAMPLE 3 | 1200° C. | 1550 | 0.6 | −48% | | | | |
| EXAMPLE 4 | 1230° C. | 1350 | 0.5 | −45% | | | | |
| EXAMPLE 5 | 1230° C. | 1350 | 0.5 | −46% | | | | |
| EXAMPLE 6 | 1230° C. | 1500 | 0.7 | −45% | | | | |
| EXAMPLE 7 | 1220° C. | 1450 | 0.6 | −48% | | | | |
| EXAMPLE 8 | 1220° C. | 1430 | 0.6 | −47% | | | | |
| EXAMPLE 9 | 1220° C. | 1430 | 0.6 | −46% | | | | |
| EXAMPLE 10 | 1200° C. | 1500 | 0.7 | −50% | | | | |
| COMPARATIVE EXAMPLE 1 | SINTERING AT 1260 DEGREES C OR LESS WAS DIFFICULT (UNEVALUABLE) | | | | | | | |
| COMPARATIVE EXAMPLE 2 | 1200° C. | 2800 | 1.2 | −60% | | | | |
| COMPARATIVE EXAMPLE 3 | 1220° C. | 2650 | 1 | −58% | | | | |
| COMPARATIVE EXAMPLE 4 | 1250° C. | 1300 | 0.6 | −43% | | | NG | |
| COMPARATIVE EXAMPLE 5 | 1200° C. | 1400 | 0.6 | −50% | | | | |
| COMPARATIVE EXAMPLE 6 | 1200° C. | 1350 | 0.5 | −45% | NG | NG | | NG |
| COMPARATIVE EXAMPLE 7 | SINTERING AT 1260 DEGREES C OR LESS WAS DIFFICULT (UNEVALUABLE) | | | | | | | |
| COMPARATIVE EXAMPLE 8 | 1160° C. | 1400 | 0.6 | −46% | | | NG | NG |
| COMPARATIVE EXAMPLE 9 | 1200° C. | 2000 | 1.2 | −55% | NG | | | |
| COMPARATIVE EXAMPLE 10 | SINTERING AT 1260 DEGREES C OR LESS WAS DIFFICULT (UNEVALUABLE) | | | | | | | |
| COMPARATIVE EXAMPLE 11 | 1180° C. | 1200 | 0.6 | −40% | | NG | NG | |
| COMPARATIVE EXAMPLE 12 | 1160° C. | 1350 | 0.5 | −46% | | NG | NG | |

Although the embodiments of the present invention have been described in detail, it is to be understood that the various change, substitutions, and alterations could be made hereto without departing from the spirit and scope of the invention.

What is claimed is:

1. A ceramic capacitor comprising:
a multilayer structure having a structure in which each of a plurality of dielectric layers and each of a plurality of internal electrode layers are alternately stacked,
wherein a main component of the plurality of dielectric layers is ceramic having a perovskite structure that includes Ba and Ti and is expressed by a general formula $A_mBO_3$ ($0.995 \leq m \leq 1.010$),
wherein the plurality of dielectric layers include a rare earth element which is at least one of Y, Gd, Tb, Dy and Ho as a first sub-component by 2.0 mol to 5.0 mol when converted into $R_2O_3/2$ (R represents the rare earth element), include Mg as a second sub-component by 1.0 mol to 3.0 mol when converted into MgO, include V as a third sub-component by 0.05 mol to 0.25 mol when converted into $V_2O_5/2$, include Si as a fourth sub-component by 0.5 mol to 5.0 mol when converted into $SiO_2$, include an alkali earth metal element M which is at least one of Ba, Sr and Ca as a fifth sub-component by 0.1 mol or more and 2.0 mol or less when converted into $MCO_3$, on a presumption that an amount of the ceramic is 100 mol,
wherein a ratio Si/V which is a ratio of the fourth sub-component with respect to the third sub-component is 30 or less.

2. The ceramic capacitor as claimed in claim 1, wherein the multilayer structure has a parallelepiped shape of which two sides are at a right angle and have a length of 10 mm or more.

3. A circuit substrate comprising:
a substrate; and
a ceramic capacitor of claim 1 mounted on the substrate.

4. A manufacturing method of a ceramic capacitor comprising:
forming a green sheet by adding a rare earth element which is at least one of Y, Gd, Tb, Dy and Ho as a first sub-component by 2.0 mol to 5.0 mol when converted into $R_2O_3/2$ (R represents the rare earth element), adding Mg as a second sub-component by 1.0 mol to 3.0 mol when converted into MgO, adding V as a third sub-component by 0.05 mol to 0.25 mol when converted into $V_2O_5/2$, adding Si as a fourth sub-component by 0.5 mol to 5.0 mol when converted into $SiO_2$, adding an alkali earth metal element M which is at least one of Ba, Sr and Ca as a fifth sub-component by 0.1 mol or more and 2.0 mol or less when converted into $MCO_3$, to ceramic powders having a perovskite structure that includes Ba and Ti and is expressed by a general formula $A_mBO_3$ (0.995≤m≤1.010), on a presumption that an amount of the ceramic powder is 100 mol, a ratio Si/V which is a ratio of the fourth sub-component with respect to the third sub-component being 30 or less;

providing a metal conductive paste for forming an internal electrode layer, on the green sheet; and firing the green sheet on which the metal conductive paste is provided.

5. A ceramic capacitor comprising:

a multilayer structure having a structure in which each of a plurality of dielectric layers and each of a plurality of internal electrode layers are alternately stacked, wherein a main component of the plurality of dielectric layers is ceramic having a perovskite structure that includes Ba and Ti and is expressed by a general formula $A_mBO_3$ (0.995≤m≤1.010), wherein the plurality of dielectric layers include a rare earth element which is at least one of Y, Gd, Tb, Dy and Ho as a first sub-component by 2.0 mol to 5.0 mol when converted into $R_2O_3/2$ (R represents the rare earth element), include Mg as a second sub-component by 1.0 mol to 3.0 mol when converted into MgO, include V as a third sub-component by 0.05 mol to 0.15 mol when converted into $V_2O_5/2$, include Si as a fourth sub-component by 0.5 mol to 5.0 mol when converted into $SiO_2$, include an alkali earth metal element M which is at least one of Ba, Sr and Ca as a fifth sub-component by 0.1 mol to 5.0 mol when converted into $MCO_3$, on a presumption that an amount of the ceramic is 100 mol, wherein a ratio Si/V which is a ratio of the fourth sub-component with respect to the third sub-component is 30 or less.

6. A ceramic capacitor comprising:

a multilayer structure having a structure in which each of a plurality of dielectric layers and each of a plurality of internal electrode layers are alternately stacked, wherein a main component of the plurality of dielectric layers is ceramic having a perovskite structure that includes Ba and Ti and is expressed by a general formula $A_mBO_3$ (0.995≤m≤1.010), wherein the plurality of dielectric layers include a rare earth element which is at least one of Y, Gd, Tb, Dy and Ho as a first sub-component by 2.0 mol to 5.0 mol when converted into $R_2O_3/2$ (R represents the rare earth element), include Mg as a second sub-component by 1.0 mol to 3.0 mol when converted into MgO, include V as a third sub-component by 0.05 mol to 0.25 mol when converted into $V_2O_5/2$, include Si as a fourth sub-component by 0.5 mol to 2.5 mol when converted into $SiO_2$, include an alkali earth metal element M which is at least one of Ba, Sr and Ca as a fifth sub-component by 0.1 mol to 5.0 mol when converted into $MCO_3$, on a presumption that an amount of the ceramic is 100 mol, wherein a ratio Si/V which is a ratio of the fourth sub-component with respect to the third sub-component is 30 or less.

* * * * *